2,776,976
HALOGEN SUBSTITUTED UNSATURATED THIAZOLYLTHIOETHERS

John J. D'Amico, Charleston, W. Va., assignor to Monsanto Chemical Company, St. Louis, Mo., a corporation of Delaware No Drawing. Application October 21, 1952, Serial No. 316,095

7 Claims. (Cl. 260—302)

The present invention relates to new compositions of matter and to methods for their preparation. More particularly the present invention relates to haloalkene substituted mercapto thiazoles. These compounds may be represented by the structure R—S—R' where R is a thiazolyl group and R' is an unsaturated halogen substituted alkenyl group. Typical examples of suitable thiazolyl radicals are 4-ethylthiazolyl, 4,5-dimethylthiazolyl, 4-methylthiazolyl, 4,5-diethylthiazolyl, 4-propylthiazolyl and 4-butylthiazolyl. Examples of suitable alkenyl groups include vinyl, allyl, propenyl, isopropenyl, butenyl, pentenyl, hexenyl, cinnamyl and decenyl groups substituted by one or more chlorine or bromine atoms.

The methods for preparing the compounds may vary. One convenient method is by the condensation of a suitable halogen substituted olefin with a mercapto thiazole in aqueous medium, removing only part of the halogen. The mercapto thiazole is usually employed in the form of an aqueous solution of its alkali metal salt. Suitable substituted olefins include cis 1,2,3-trichloro-2-butene, cis 1,2,3-trichloro-1-propene, trans 1,2,3-trichloro-1-propene and 2,3,3-trichloro-1-butene. The last readily undergoes an allylic rearrangement and is therefore equivalent to 1,2,3-trichloro-2-butene.

The following examples illustrate the preparation of the new products but are not to be taken as limitative.

Example 1

A solution containing 0.55 molecular proportion of mixed ethyl and dimethyl-2-thiazolethiol was prepared by dissolving 80 parts by weight of mixed ethyl and dimethyl-2-thiazolethiol in 84 parts by weight of 25% sodium hydroxide and 550 parts by weight of water. The solution was filtered, and to the filtered solution was gradually added 55.5 parts by weight of 2,3-dichloro-1-propene. An exothermic reaction set in, the temperature rising from 26° to 33° C. within 20 minutes. The reaction mixture was stirred for 6 hours and the organic layer separated. The unreacted mixed ethyl and dimethyl-2-thiazolethiol was recovered from the aqueous layer by acidification with concentrated hydrochloric acid. The amber oily organic layer was dissolved in ethyl ether, washed repeatedly with 2% sodium hydroxide, then with water until the wash water was neutral to litmus and the solvent was removed by distillation. The residue was dried over Attapulgus clay. 106 parts by weight of an amber oily product was obtained. It boiled at 99°–101° C./1 mm. Analysis confirmed that the product was the expected 3-(mixed ethyl and dimethyl-2-thiazolylmercapto)-2-chloro-1-propene. Calcd. for $C_8H_{10}ClNS_2$:

|          | Calcd. | Found |
|----------|--------|-------|
|          | Percent | Percent |
| Nitrogen | 6.37   | 6.50  |
| Chlorine | 16.13  | 16.02 |

Example 2

To a solution of the sodium salt of mixed ethyl and dimethyl-2-thiazolethiol as prepared in the preceding example there was gradually added 62.5 parts of 1,3-dichloro-2-butene. The temperature rose from 26° to 40° C. within 20 minutes. Stirring was continued for 6 hours and the organic layer separated. The unreacted ethyl and dimethyl-2-thiazolethiol was recovered from the aqueous layer by acidification with concentrated hydrochloric acid. The amber oily organic layer was dissolved in ethyl ether, washed repeatedly with 2% sodium hydroxide, then with water until the wash water was neutral to litmus and the solvent was removed by distillation. The residue was dried over Attapulgus clay. 111 parts by weight of an amber oily product was obtained. It boiled at 119°–120° C./1 mm. Analysis confirmed that the product was the expected 4-(mixed ethyl and dimethyl-2-thiazolylmercapto)-2-chloro-2-butene. Calcd. for $C_9H_{12}ClNS_2$:

|          | Calcd. | Found |
|----------|--------|-------|
|          | Percent | Percent |
| Sulfur   | 27.43  | 27.63 |
| Chlorine | 15.17  | 14.99 |

Example 3

A solution of the sodium salt of 4-methyl-2-thiazolethiol was prepared from 34 parts by weight (0.26 molecular proportion) of 4-methyl-2-thiazolethiol, 41.5 parts by weight (0.26 molecular proportion) of 25% aqueous sodium hydroxide and 300 parts by weight of water. To the solution so prepared there was gradually added 28.5 parts by weight (0.26 molecular proportion) of 2,3-dichloro-1-propene. The organic layer was then separated and dissolved in a suitable solvent such as ethyl ether. The organic solution was then repeatedly extracted with 2% sodium hydroxide and washed with water until the washings were neutral. The solvent was then removed and the residue dried and recovered. 45 parts by weight of 3-(4-methyl-2-thiazolylmercapto)-2-chloro-1-propene, an amber oily product, B. P. 91°–93° C./1 mm., was obtained, $n_D^{25}$ 1.5849. Analysis gave 7.01% nitrogen, 31.12% sulfur and 17.17% chlorine as compared to 6.81% nitrogen, 31.17% sulfur and 17.23% chlorine calculated for $C_7H_8ClNS_2$.

Example 4

Following the method in the preceding example 4-(4-methyl - 2 - thiazolylmercapto) - 2 - chloro - 2 - butene was prepared by condensing 1,3-dichloro-2-butene with 4-methyl-2-thiazolethiol. The product was an amber oil obtained in 91.9% yield, B. P. 112°–114° C./1 mm., $n_D^{25}$ 1.5840. Analysis gave 6.66% nitrogen, 29.08% sulfur and 16.06% chlorine as compared to calculated values for $C_8H_{10}ClNS_2$ of 6.37% nitrogen, 29.18% sulfur and 16.13% chlorine.

Example 5

A solution of the potassium salt of 5-carbomethoxy-4-methyl-2-thiazolethiol was prepared from 47.3 parts by weight (0.25 molecular proportion) of 5-carbomethoxy-4-methyl-2-thiazolethiol, 14.1 parts by weight (0.25 molecular proportion) of potassium hydroxide, 1000 ml. of acetone, and 10 ml. of water. To this solution so prepared there was gradually added 31.2 parts by weight (0.25 molecular proportion) of 1,3-dichloro-2-butene. An exothermic reaction set in, the temperature rising from 30° to 35° C. within 4 minutes. The reaction mixture was stirred for 6 hours. The potassium chloride was collected by filtration. The acetone was removed from the filtrate by distillation under reduced pressure. The solid was diluted with water, filtered, washed with water until the washings were neutral to litmus, and air dried at room temperature. The product, a tan solid, M. P. 53–55° C., was obtained in 85.1% yield. After recrystallization from a mixture of ethyl alcohol and water, it melted at 60–60.5° C. Analysis confirmed that the product was the expected 4-(5-carbomethoxy-4-methyl-2-thiazolylmercapto)-2-chloro-2-butene. Calcd. for $C_{10}H_{12}ClNO_2S_2$

|  | Calcd. | Found |
| --- | --- | --- |
|  | Percent | Percent |
| Nitrogen | 5.04 | 5.06 |
| Sulfur | 23.08 | 23.28 |
| Chlorine | 12.76 | 12.66 |

*Example 6*

The procedure of Example 5 was followed substituting 50.83 parts by weight (0.25 molecular proportion) of 5-carbethoxy-4-methyl-2-thiazolethiol for the 5-carbomethoxy-4-methyl-2-thiazolethiol. An exothermic reaction set in, the temperature rising from 30° to 33° C. over a period of 15 minutes. Upon removal of the acetone under reduced pressure an amber oil resulted which was dried over Attapulgus clay. 61 parts by weight of an amber oily product was obtained. The oil could not be distilled without decomposition under 1 mm. pressure. Analysis confirmed that the product was the desired 4-(5-carbethoxy-4-methyl-2-thiazolylmercapto)-2-chloro-2-butene. Calcd. for $C_{11}H_{14}ClNO_2S_2$

|  | Calcd. | Found |
| --- | --- | --- |
|  | Percent | Percent |
| Nitrogen | 4.80 | 4.90 |
| Chlorine | 12.15 | 12.00 |

*Example 7*

The general procedure of Example 5 was followed employing 101.7 parts by weight (0.5 molecular proportion) of 5-carbethoxy-4-methyl-2-thiazolethiol in 600 ml. of acetone, 28.2 parts by weight (0.5 molecular proportion) of potassium hydroxide, 55.5 parts by weight (0.5 molecular proportion) of 2,3-dichloro-1-propene. The reaction mixture was heated at 55°–56° C. for 6 hours and then cooled to room temperature and the potassium chloride removed by filtration. The residue obtained after removal of the acetone under reduced pressure was an amber oil. This product was dried over sodium sulfate. 115 parts by weight of an amber oil which could not be distilled without decomposition under 1 mm. pressure was obtained. Analysis confirmed the product to be 3-(5-carbethoxy-4-methyl-2-thiazolylmercapto)-2-chloro-1-propene. Calcd. for $C_{10}H_{12}ClNO_2S_2$

|  | Calcd. | Found |
| --- | --- | --- |
|  | Percent | Percent |
| Nitrogen | 5.04 | 4.76 |
| Chlorine | 12.76 | 12.22 |

*Example 8*

The procedure of the preceding Example 7 was followed substituting 94.6 parts by weight (0.5 molecular proportion) of 5-carbomethoxy-4-methyl-2-thiazolethiol for the 5-carbethoxy-4-methyl-2-thiazolethiol. The product was an oil (110 parts by weight) which could not be distilled without decomposition at 1 mm. pressure. Although the product could not be purified, analysis of the crude oil indicated that it was the desired 3-(5-carbomethoxy-4-methyl-2-thiazolylmercapto)-2-chloro-1-propene. Calcd. for $C_9H_{10}ClNO_2S_2$

|  | Calcd. | Found |
| --- | --- | --- |
|  | Percent | Percent |
| Nitrogen | 5.31 | 4.92 |
| Chlorine | 13.44 | 13.00 |

*Example 9*

The procedure of Example 7 was followed employing 115.7 parts by weight (0.5 molecular proportion) of 5-carbobutoxy-4-methyl-2-thiazolethiol, 62.5 parts by weight (0.5 molecular proportion) of 1,3-dichloro-2-butene. 150 parts by weight of an amber oily product was isolated which could not be distilled without decomposition at 1 mm. pressure. Analysis of the crude product confirmed that it was the desired 4-(5-carbobutoxy-4-methyl-2-thiazolylmercapto)-2-chloro-2-butene. Calcd. for $C_{13}H_{18}ClNO_2S_2$

|  | Calcd. | Found |
| --- | --- | --- |
|  | Percent | Percent |
| Nitrogen | 4.38 | 4.43 |
| Sulfur | 20.05 | 19.97 |

Mixtures of halogen substituted olefins can be employed where desired as well as the pure compounds. For example a mixture of 1,3-dichloropropene, 2,3-dichloro-1-propene and 1,2,3-trichloropropane has been employed successfully. In this reaction the analysis indicated that only the olefins reacted.

These compounds are useful vulcanizing agents for synthetic rubbery copolymers of butadiene and acrylonitrile commonly known by the trade names Hycar and Perbunan. They also possess vulcanizing and accelerating activity for the rubbery copolymers of isobutylene with a small proportion of diolefin such as known under the trade name Butyl rubber. The compounds are soluble in mineral oil fractions and impart extreme pressure properties to mineral lubricating oil fractions in which they are incorporated. For example mineral oil lubricants were prepared containing 5% by weight of the products of Examples 1 and 4 and the load carrying capacity measured by means of an S. A. E. machine. In both cases the lubricants containing the new compounds were characterized by extreme pressure properties. They also possess other uses as for example as pesticides and intermediates. Use as pesticides is limited by the fact the compounds are toxic to plants. Thus the new compounds may be applied to plants for the purpose of destroying them. Many of the new compounds are efficient defoliants when contained as the active constituent in a spray uniformly applied to the foliage of the plants.

It is intended to cover all changes and modifications of the examples of the invention herein chosen for purposes of disclosure which do not constitute departures from the spirit and scope of the invention.

This application is a continuation-in-part of application Serial No. 265,211, filed January 5, 1952, now abandoned.

What is claimed is:

1. A compound of the structure

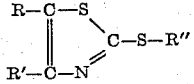

where R is a member of the group consisting of hydrogen, lower alkyl and lower carboalkoxy groups, R' represents a lower alkyl group and R" represents an unsaturated halogen substituted alkenyl group containing less than five carbon atoms in which the halogen is attached to unsaturated carbon but containing not more than one halogen substituent on any one carbon atom.

2. A mixture of compounds the compounds being of the structure

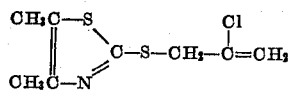

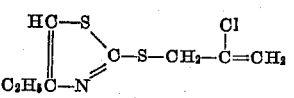

3. A mixture of compounds the compound being of the structure

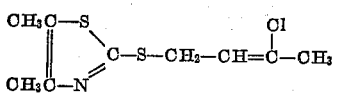

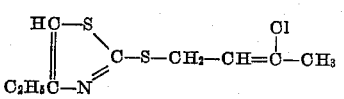

4. The compound 3-(4-methyl-2-thiazolylmercapto)-2-chloro-1-propene.

5. The compound 4-(4-methyl-2-thiazolylmercapto)-2-chloro-2-butene.

6. A compound of the structure

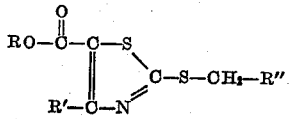

where R and R' represent lower alkyl groups and R'' represents a chloro substituted 1-alkenyl group containing less than 5 carbon atoms having the chlorine attached to unsaturated carbon but containing not more than one chloro substituent attached to any one carbon atom.

7. The method of preparing a halogen substituted unsaturated thiazolylthioether which comprises condensing in aqueous solution an alkali metal salt of a mercapto thiazole of the structure

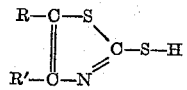

where R is a member of the group consisting of hydrogen, lower alkyl and lower carboalkoxy groups and R' represents a lower alkyl group with a poly chloro olefin of the structure Cl—CH$_2$—R'' where R'' represents a chloro substituted 1-alkenyl group containing less than five carbon atoms having the chloro substituent attached to an unsaturated carbon but containing not more than one chloro substituent attached to any one carbon atom.

References Cited in the file of this patent

UNITED STATES PATENTS

| | | |
|---|---|---|
| 2,092,712 | Clifford | Sept. 7, 1937 |
| 2,304,557 | Ebelke | Dec. 8, 1942 |

FOREIGN PATENTS

| | | |
|---|---|---|
| 340,951 | Great Britain | Jan. 1, 1931 |